US011867639B2

(12) United States Patent
Wen et al.

(10) Patent No.: US 11,867,639 B2
(45) Date of Patent: Jan. 9, 2024

(54) METHOD AND APPARATUS FOR FLATTENING AND IMAGING A PRINTED THIN FILM PRODUCT

(71) Applicant: TE Connectivity Services GmbH, Schaffhausen (CH)

(72) Inventors: Du Wen, Reading, PA (US); Anthony L Swann, Lancaster, PA (US); Roberto Francisco-Yi Lu, Bellevue, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/475,870

(22) Filed: Sep. 15, 2021

(65) Prior Publication Data
US 2023/0077585 A1    Mar. 16, 2023

(51) Int. Cl.
G01N 21/88    (2006.01)
G01N 21/89    (2006.01)
(Continued)

(52) U.S. Cl.
CPC ..... *G01N 21/8851* (2013.01); *G01N 21/8914* (2013.01); *G06T 7/0004* (2013.01);
(Continued)

(58) Field of Classification Search
CPC ........... G01N 21/8851; G01N 21/8914; G01N 2021/8927; G06V 10/12; G06V 10/10;
(Continued)

(56) References Cited

U.S. PATENT DOCUMENTS

| 11,154,231 B2 * | 10/2021 | Coleman | A61B 5/318 |
| 2003/0038420 A1 * | 2/2003 | Cleary | B65H 11/005 |
| | | | 271/197 |

(Continued)

FOREIGN PATENT DOCUMENTS

| CN | 1993652 A | * | 7/2007 | ......... G03F 7/70791 |
| CN | 105247351 A | * | 1/2016 | ............... B41J 2/00 |

(Continued)

OTHER PUBLICATIONS

K. Jain, T. Dunn, N. Farmiga, M. Zemel, C.Weisbecker, and T. Lee, "Lithography on flexible substrates: a roll-to-roll, high, throughput, high-resolution system," in Proc. SPIE, Emerging Lithographic Technologies, vol. 3331, Santa Clara, CA, 1998, pp. 197-206. (Year: 1998).*

(Continued)

*Primary Examiner* — Michael Robert Cammarata (57) ABSTRACT

A film inspection system includes a film positioner having a film holder configured to hold a printed film having a printed layer on a substrate of the printed film. The film holder is configured to fix a perimeter of the printed film. The film positioner includes a film stretcher positioned relative to the film holder to interface with the printed film. The film stretcher is movable relative to the film holder to stretch the printed film at a stretch area while the perimeter of the printed film is fixed by the film holder. The film inspection system includes a vision system having an imaging device configured to image the printed film at a scan area within the stretch area. The film holder and the imaging device are movable relative to each other to move the scan area along the printed layer to image the printed layer of the printed film.

20 Claims, 6 Drawing Sheets

(51) Int. Cl.
  G06T 7/00 (2017.01)
  G06V 10/10 (2022.01)
  G06V 10/12 (2022.01)
(52) U.S. Cl.
  CPC .............. G06V 10/10 (2022.01); G06V 10/12 (2022.01); G06T 2207/30108 (2013.01)
(58) Field of Classification Search
  CPC .................. G06V 10/00; G06T 7/0004; G06T 2207/30108; G06T 2207/30148; G06T 2207/30144
  See application file for complete search history.

(56) References Cited

U.S. PATENT DOCUMENTS

| | | | | |
|---|---|---|---|---|
| 2004/0094329 | A1* | 5/2004 | Durocher | H05K 3/0058 174/254 |
| 2008/0094465 | A1* | 4/2008 | Okutsu | B41J 11/0085 347/248 |
| 2015/0202821 | A1* | 7/2015 | Saha | B29C 55/20 425/383 |
| 2022/0292328 | A1* | 9/2022 | Yang | G06V 10/82 |
| 2022/0318982 | A1* | 10/2022 | Osunkwo | G06N 3/04 |

FOREIGN PATENT DOCUMENTS

| | | | | |
|---|---|---|---|---|
| CN | 111929317 | A | * | 11/2020 |
| CN | 212364502 | U | * | 1/2021 |
| CN | 113447461 | A | * | 9/2021 ............. G01N 21/55 |
| CN | 113686877 | A | * | 11/2021 |
| CN | 113866177 | A | * | 12/2021 |
| CN | 215449038 | U | * | 1/2022 |
| CN | 114472325 | A | * | 5/2022 |
| JP | H075719 | Y2 | * | 2/1995 |
| JP | 2013104805 | A | * | 5/2013 |
| KR | 20070069550 | A | * | 7/2007 |
| KR | 20110117797 | A | * | 10/2011 |
| KR | 20230031509 | A | * | 3/2023 |
| WO | WO-2021118468 | A1 | * | 6/2021 |

OTHER PUBLICATIONS

K. Jain, M. Klosner, M. Zemel and S. Raghunandan, "Flexible Electronics and Displays: High-Resolution, Roll-to-Roll, Projection Lithography," in Proc. IEEE, vol. 93, No. 8, pp. 1500-1510, Aug. 2005, doi: 10.1109/JPROC.2005.851505. (Year: 2005).*

* cited by examiner

---
METHOD AND APPARATUS FOR FLATTENING AND IMAGING A PRINTED THIN FILM PRODUCT

BACKGROUND OF THE INVENTION

The subject matter herein relates generally to methods and apparatus for defect detection in a product.

Defect detection is performed during product manufacture for quality control. For example, some known inspection systems using vision inspection systems to image the product and analyze the image for defects. If defects are detected, the product may be scrapped are processed to correct for the defect. A need remains for a system and method for inspecting thin film products for defects, such as thin films having a printed layer on the thin film substrate. For example, flexible circuits, antennas, tamper-evident films and other products may have printed layers printed on the surface of a thin, flexible film. Post-manufacture inspection of the printed film product leads to scraping of products having defects, such as foreign object debris (FOD), scratches, voids, and the like. Significant time and resources are wasted using the post-manufacture inspection, such as time and resources in curing the printed layers after application when the defects could have been identified prior to the processing steps. For example, defect detection after application of the printed layer but prior to curing is desirable. However, inspection of wet printed, thin film products is difficult to perform. Wrinkling in the material makes defect inspection difficult and unreliable. The wrinkles have negative impact on the results of image processing. For example, the wrinkles in the inspection area are difficult to be differentiated from other defects and thus lead to false positives and increased scrapping of the products. Some known systems use vacuum tables to reduce wrinkles. However, the vacuum tables do not eliminate the wrinkles in the thin film material.

A need remains for methods and apparatus for reliable defect inspection of thin film products.

BRIEF DESCRIPTION OF THE INVENTION

In one embodiment, a film inspection system is provided and includes a film positioner having a film holder configured to hold a printed film having a printed layer on a substrate of the printed film. The film holder is configured to fix a perimeter of the printed film. The film positioner includes a film stretcher positioned relative to the film holder to interface with the printed film. The film stretcher is movable relative to the film holder to stretch the printed film at a stretch area while the perimeter of the printed film is fixed by the film holder. The film inspection system includes a vision system having an imaging device configured to image the printed film at a scan area within the stretch area. The film holder and the imaging device are movable relative to each other to move the scan area along the printed layer to image the printed layer of the printed film.

In another embodiment, a film inspection system is provided and includes a film positioner having a support plate having a support surface configured to support a printed film has a printed layer on a substrate of the printed film. The film positioner has a film holder configured to hold the printed film and fixed a perimeter of the printed film relative to the film holder. The support plate is movable relative to the film holder to a released position to release the printed film from the support surface after the printed film is fixed to the film holder. The film positioner includes a film stretcher positioned relative to the support plate and the film holder to interface with the printed film. The film stretcher movable relative to the film holder to an extended position to stretch the printed film at a stretch area while the perimeter of the printed film is fixed by the film holder. The film inspection system includes a vision system having an imaging device configured to image the printed film at a scan area within the stretch area. The film holder is movable relative to the imaging device and the film stretcher to move the scan area along the printed layer for line scan imaging the printed layer of the printed film. The vision system includes an imaging controller processing the image to identify defects.

In a further embodiment, a method of inspecting a printed film for defects is provided and includes fixing the printed film in a film holder. The method stretches the printed film using a film stretcher to remove wrinkles from the printed film at a stretch area while the perimeter of the printed film is fixed by the film holder. The method images the printed film at a scan area within the stretch area using an imaging device. The method scans the printed film by moving the film holder and the printed film relative to the imaging device to image the entire printed film and processes the image of the printed film to identify defects.

DETAILED DESCRIPTION OF THE INVENTION

Figure 1:
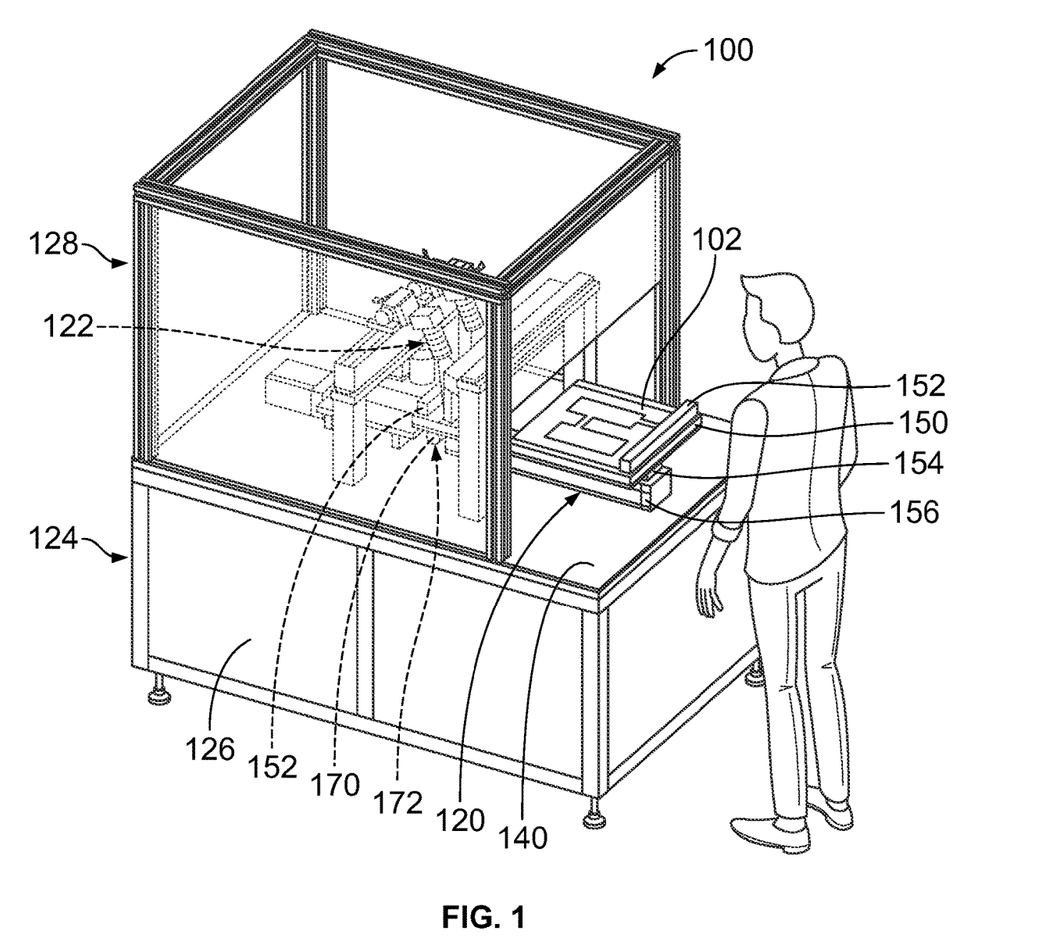
FIG. 1 illustrates a film inspection system in accordance with an exemplary embodiment.

FIG. 1 illustrates a film inspection system 100 in accordance with an exemplary embodiment. The film inspection system 100 is used to inspect a printed film 102 for defects. In an exemplary embodiment, the film inspection system 100 is used to inspect the printed film 102 as a wet printed product, such as before the printed film 102 is placed into an oven to cure or dry the printed layer of the printed film 102. The printed product is inspected for defects to reduce waste or scrap that would occur upon inspection after the printed film 102 is oven cured or dried. As such, time and resources are saved by identifying defects on the wet printed product. The film inspection system 100 may be used for identifying defects such as foreign object debris (FOD), scratches, voids, and the like in the printed layer of the printed film 102. In an exemplary embodiment, the film inspection system 100 reduces wrinkles and flattens the printed film 102 prior to inspection to improve inspection results. The printed film 102 is flattened and the wrinkles are reduced without touching the wet printed layer to avoid damaging the wet printed layer.

Figure 2:
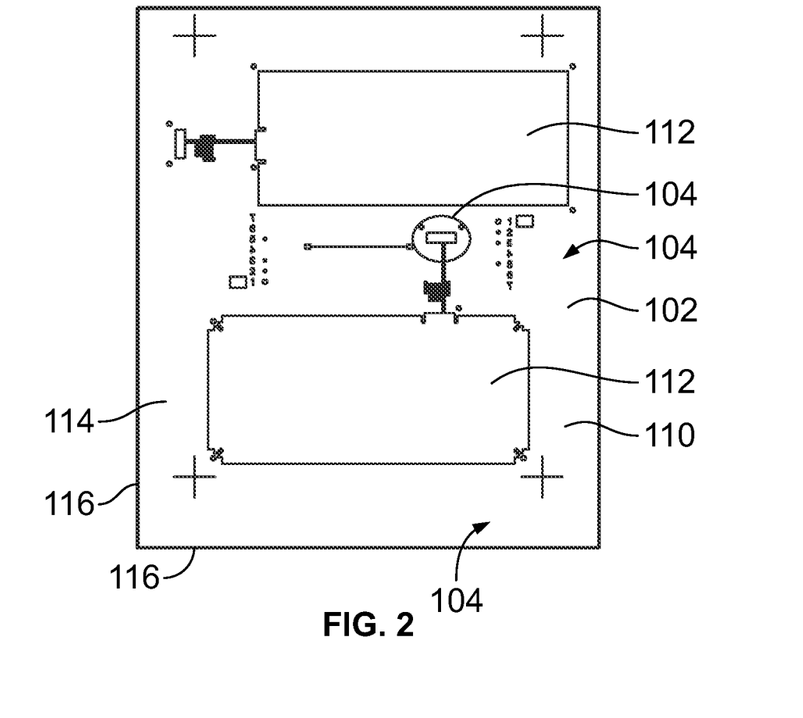
FIG. 2 illustrates the printed film in accordance with an exemplary embodiment.
Figure 3:
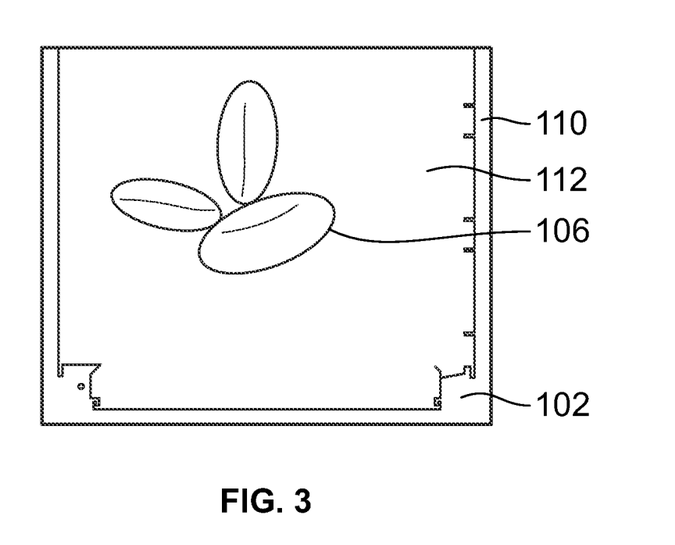
FIG. 3 illustrates an enlarged view of a portion of the printed film in accordance with an exemplary embodiment.

With additional reference to FIGS. 2 and 3, FIG. 2 illustrates the printed film 102 in accordance with an exemplary embodiment and FIG. 3 is an enlarged view of a portion of the printed film 102 in accordance with an exemplary embodiment. FIG. 2 illustrates wrinkles 104 and the printed film 102. FIG. 3 illustrates defects 106 in the printed film 102. The wrinkles 104 may be reduced or eliminated by the film inspection system by flattening the printed film 102 prior to inspection to improve inspection results and more easily identify the defects 106.

In an exemplary embodiment, the printed film 102 is a thin film structure, such as a flexible circuit, an antenna, a tamper film, or other type of thin film structure. The printed film 102 includes a substrate 110 and a printed layer 112 printed on a surface 114 of the substrate 110, such as an upper surface. Optionally, portions of the substrate 110 are uncovered by the printed layer 112, such as along an outer perimeter 116 of the substrate 110. The substrate 110 is flexible. The substrate 110 may be manufactured from a thermoplastic material, such as a fluoropolymer material. In various embodiments, the substrate 110 is a polyvinylidene fluoride or polyvinylidene difluoride (PVDF) material. The printed layer 112 is applied directly to the substrate 110. The printed layer 112 may be screen printed, inkjet printed, or otherwise deposited on the substrate 110. Optionally, the printed layer 112 may include multiple stacked layers. For example, the printed layer 112 may have alternating layers of conductive inks (for example, silver ink) and dielectric inks printed on the substrate 110. The printed layer 112 may be printed in a predetermined area or predetermined pattern. For example, the printed layer 112 may have a circuit pattern or an antenna pattern. In an exemplary embodiment, after printing, but before curing, the film inspection system 100 inspects the printed layer 112 on the substrate 110 for the defects 106. For example, the film inspection system 100 may inspect for scratches or voids in the printed layer 112. In an exemplary embodiment, the substrate 110 is flattened prior to inspection by the film inspection system 100 to reduce or eliminate the wrinkles 104 in the substrate 110 to improve inspection of the printed layer 112.

With reference back to FIG. 1, the film inspection system 100 includes a film positioner 120 and a vision system 122. The film positioner 120 positions the printed film 102 for inspection by the vision system 122. The vision system 122 is configured to image the printed film 102 and analyze the image to identify defects in the printed layer 112. In an exemplary embodiment, the vision system 122 is configured to generate a line scan image of the printed film 102 during the imaging process. The printed film 102 and the vision system 122 move relative to each other during the imaging process to perform the line scan imaging. For example, in an exemplary embodiment, the film positioner 120 moves the printed film 102 during the line scan imaging. In alternative embodiments, the vision system 122 may move relative to the printed film 102 during the line scan imaging while the printed film 102 remains stationary. In other alternative embodiments, both the printed film 102 in the vision system 122 may move during the line scan imaging process.

In an exemplary embodiment, the film inspection system 100 includes a frame 124 having a base 126 and a hood 128 above the base 126. The hood 128 defines an enclosure or space that receives the printed film 102 for inspection by the vision system 122. The base 126 supports the components of the film inspection system 100, such as the film positioner 120 and the vision system 122. For example, the base 126 may include support arms extending into the enclosure to support the components within the enclosure. The base 126 may be formed by a plurality of frame members (for example, horizontal and vertical beams) and panels or walls between the frame members. The base 126 may include feet at the bottom of the base 126 to support the base 126 on the floor. The base 126 may include a top plate at the top of the base 126 that supports the components of the film inspection system 100. The hood 128 is located above the top plate. The hood may be formed by a plurality of frame members and panels or walls to form the enclosure. The walls may be transparent to allow the operator to view inside the enclosure.

In an exemplary embodiment, the film positioner 120 includes a support plate 140, a film holder 150, and a film stretcher 170. The support plate 140 initially supports the printed film 102. For example, the operator may load the printed film 102 onto the support plate 140. The support plate 140 may be a vacuum plate configured to create vacuum pressure to hold the printed film 102 on the support plate 140. The vacuum pressure may generally flatten the printed film 102 against the upper surface of the support plate 140 and eliminate some or most of the wrinkles 104. The film holder 150 is secured to the printed film 102 and used to hold the printed film 102 during the imaging process. In an exemplary embodiment, the film holder 150 includes clamps 152 to fix the printed film 102 within the film holder 150. For example, the clamps 152 may clamp against opposite first and second sides of the printed film 102 to fix the sides of the printed film 102 at the outer perimeter of the printed film 102. The support plate 140 may be released from a supporting position after the film holder 150 holds the printed film 102. For example, the support plate 140 may be lowered to a released position to release the printed film 102 from the support. In alternative embodiments, the film holder one may be moved upward to lift the printed film 102 off of the support plate 140.

The film stretcher 170 is positioned relative to the film holder 150 to interface with the printed film 102. The film stretcher 170 is movable relative to the film holder 150 to stretch the printed film 102 at a stretch area while the perimeter of the printed film 102 (for example, at the opposite first and second sides) is fixed by the film holder 150. For example, the film stretcher 170 may be actuated to an extended position to press against the bottom surface of the printed film 102. The film stretcher 170 stretches the printed film 102 as the film stretcher 170 presses against the bottom surface of the printed film 102 from below, which reduces the wrinkles in the stretch area. The film stretcher 170 reduces wrinkles in the stretch area to improve defect detection on the printed film by the vision system 122. In an exemplary embodiment, the film stretcher 170 includes an idler roller 172 configured to roll along the bottom surface of the printed film 102 during the imaging process. For example, the printed film 102 may be moved side-to-side relative to the idler roller 172 during the imaging process, in the idler roller 172 rolls along the bottom surface to reduce friction, scratching, marring, or otherwise damaging the printed film 102. In an exemplary embodiment, the idler roller 172 remains in a fixed position relative to the vision system 122 during the scanning process such that the scan line imaged by the vision system 122 is located at the idler roller 172 to ensure that the wrinkles are removed in the scan area during the scanning process.

In an exemplary embodiment, the film holder 150 includes a carriage 154 coupled to and slidable along a rail 156. The carriage 154 is movable along the rail 156 between a first position and a second position. The carriage 154 moves the printed film 102 with the carriage 154 relative to the film stretcher 170 and the imaging system 122. The imaging system 122 is configured to line scan image the printed film 102 as the printed film 102 is moved between the first position and the second position. The film stretcher 170 stretches the printed film 102 in the scan area to reduce the wrinkles in the area of the printed film 102 being scanned to improve defect detection on the printed film 102 by the vision system 122. In an alternative embodiment, the carriage 154 may support the film stretcher 170 and/or the vision system 122 to move the film stretcher 170 and/or the vision system 122 relative to the film holder 150 and the printed film 102, which remain static relative to the frame 124. In such embodiments, the film stretcher 170 and the vision system 122 may move together such that the film stretcher 170 moves the stretch area along the printed film 102 with the scan area to ensure that the wrinkles are removed in the scan area during the scanning process.

Figure 4:
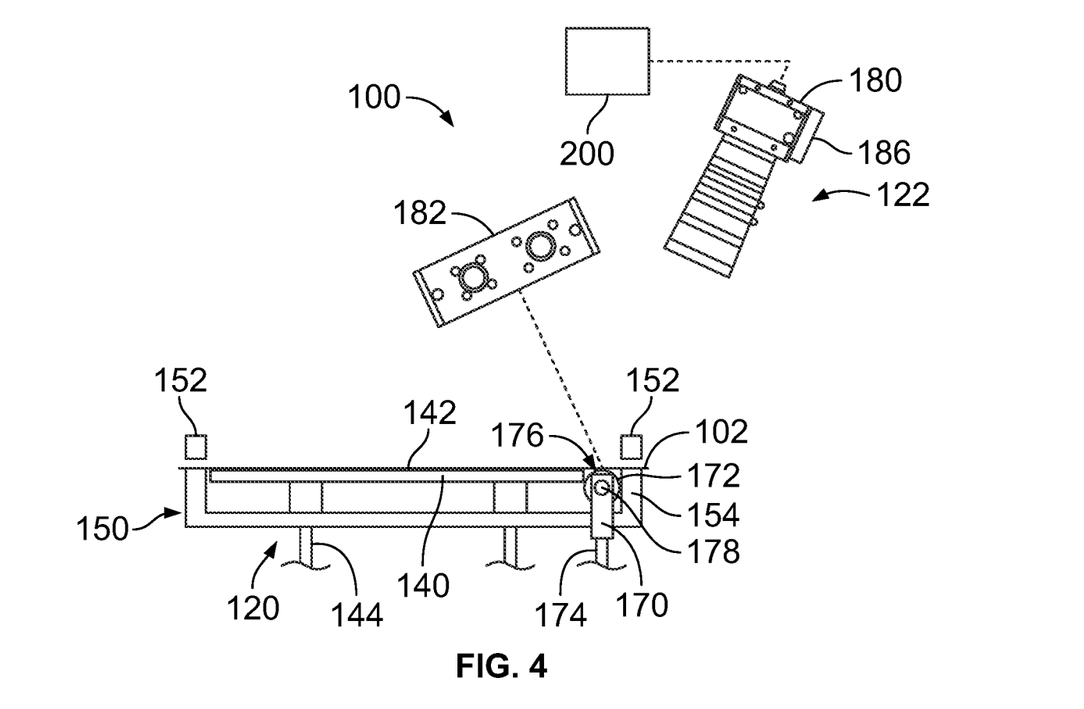
FIG. 4 is a side view of a portion of the film inspection system showing the film positioner and the vision system in accordance with an exemplary embodiment.

FIG. 4 is a side view of a portion of the film inspection system 100 showing the film positioner 120 and the vision system 122 in accordance with an exemplary embodiment. FIG. 4 illustrates the film positioner 120 at an initial film positioning stage. The film positioner 120 is used to position and hold the rented film 102 for inspection by the vision system 122. In an exemplary embodiment, the vision system 122 includes an imaging device 180 and a lighting device 182. The imaging device 180 is focused at a scan area. The lighting device 182 provides lighting at the scan area. The lighting device 182 may include multiple light sources to light the scan area from different angles. In an exemplary embodiment, the imaging device 180 includes a camera 186, such as a line scan camera which images a single scan line in a linear imaging technique with relative movement between the camera and the printed film during imaging.

In an exemplary embodiment, the vision system 122 includes a controller 200, such as a computer or other processing device, for analyzing the images to identify defects. For example, the controller 200 may analyze the image for anomalies, such as using a boundary recognition tool or an image comparison tool.

The wet printed product is inspected for defects to reduce waste or scrap that would occur upon inspection after the printed film 102 is oven cured or dried. As such, time and resources are saved by identifying defects on the wet printed product. The film inspection system 100 may be used for identifying defects such as foreign object debris (FOD), scratches, voids, and the like in the printed layer of the printed film 102.

Figure 5:
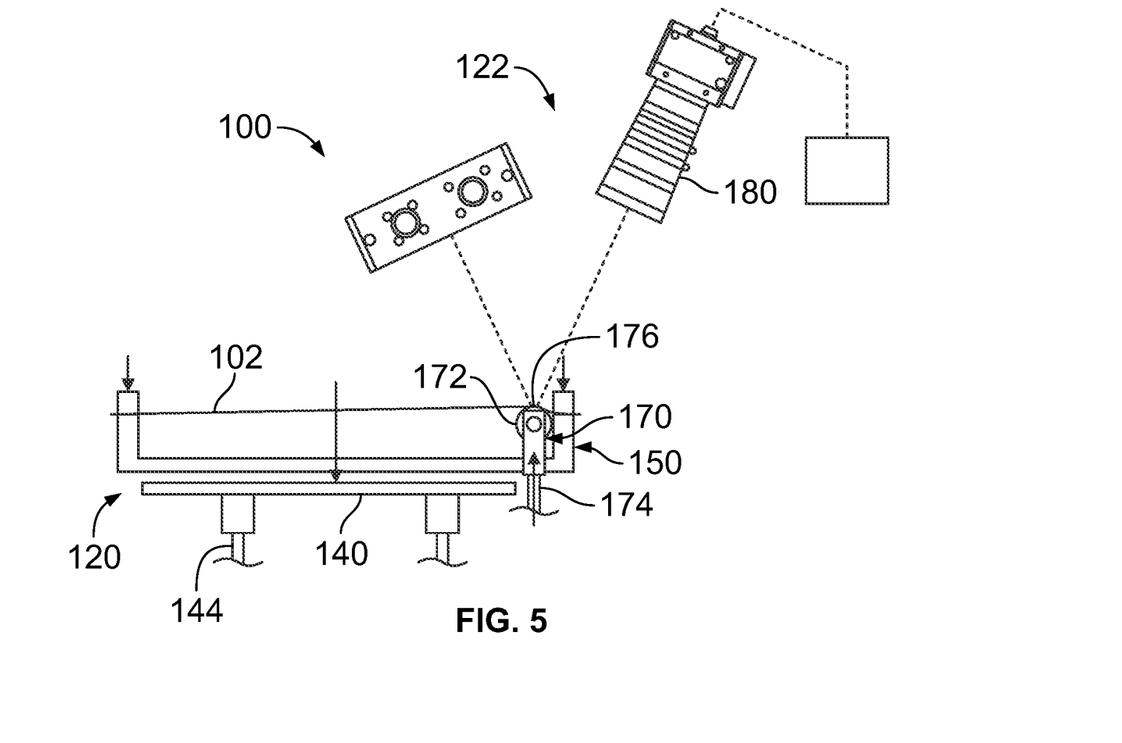
FIG. 5 is a side view of a portion of the film inspection system showing the film positioner and the vision system in accordance with an exemplary embodiment.

During operation, the printed film 102 is placed on a support surface 142 of the support plate 140. The printed film 102 may be manually positioned on the support surface 142. Alternatively, the printed film 102 may be automatically positioned on the support surface 142, such as by another machine. The support plate 140 holds the printed film 102 in a generally horizontal orientation. Optionally, the support plate 140 may be a vacuum plate to flatten the printed film 102 against the support surface 142. In an exemplary embodiment, the support plate 140 includes a support plate actuator 144 used to move the support plate 140 between a supporting position (shown in FIG. 4) and a released position (FIG. 5). The released position may be below the supporting position. The support surface 142 engages and supports the printed film 102 in the supporting position. The support surface 142 is disengaged from the printed film 102 in the released position.

During operation, the film holder 150 is coupled to the printed film 102. For example, while the printed film 102 is supported by the support plate 140, the carriage 154 of the film holder 150 is positioned relative to the printed film 102. The clamps 152 are clamped to the printed film 102 to fix the printed film 102 to the film holder 150. For example, the clamps 152 may engage the sides of the printed film 102, such as at the perimeter of the printed film 102. Optionally, the clamps 152 may be clamped to the opposite first and second sides of the printed film 102 but not the ends of the printed film 102. Alternatively, the clamps 152 may be clamped to both the sides and the ends around the entire perimeter. After the printed film 102 is fixed to the film holder 150, the support plate 140 may be moved to the released position and disengage from the printed film 102.

In an exemplary embodiment, the film stretcher 170 is positioned relative to the film holder 150 to interface with the printed film 102. The film stretcher 170 includes a film stretcher actuator 174 configured to move the film stretcher 170 between a retracted position (shown in FIG. 4) and an extended position (FIG. 5). For example, the film stretcher actuator 174 may move the idler roller 172 in a vertical direction between the retracted position in the extended position. The idler roller 172 is moved vertically upward from the retracted position to the extended position to interface with the printed film 102 and stretch the printed film 102. The film stretcher 170 (for example, the idler roller 172) is disengaged from the printed film 102 in the retracted position. The film stretcher 170 is configured to engage and stretch the printed film 102 in the extended position. In an exemplary embodiment, the film stretcher 170 is located proximate to the scan area of the imaging device 180. The film stretcher 170 includes a film interface 176, such as at the top of the idler roller 172, configured to interface with the printed film 102. The film interface 176 extends along an axis 178 parallel to the axis of rotation of the idler roller 172. In an exemplary embodiment, the scan area 184 of the imaging device 180 extends along the film interface 176.

FIG. 5 is a side view of a portion of the film inspection system 100 showing the film positioner 120 and the vision system 122 in accordance with an exemplary embodiment. FIG. 5 illustrates the film positioner 120 at a second film positioning stage. During use, after the printed film 102 is fixed in the film holder 150, the support plate 140 may be moved to the released position. For example, the support plate actuator 144 moves the support plate 140 downward to the released position. In the released position, the printed film 102 is supported by the film holder 140 and is not supported by the support plate 140. The film holder 150 is free to move the printed film 102 relative to the support plate 140 without dragging or interference with the support plate 140. As such, the printed film 102 is not damaged by the support plate 140 as the printed film 102 is moved during the imaging process.

During use, the film stretcher 170 is used to stretch the printed film 102 to reduce wrinkles in the printed film 102 for enhanced imaging by the vision system 122. The film stretcher 170 is moved to the extended position by the film stretcher actuator 174. The idler roller 172 is pressed against the bottom surface of the printed film 102 to stretch the printed film 102. The printed film 102 is pressed upward and stretched between the clamped sides of the printed film 102. The stretching action of the printed film 102 reduces the wrinkles in the printed film 102, particularly in a stretch area in close proximity to the film interface 176. The effectiveness of the stretching to reduce the wrinkling in the printed film 102 is greater closer to the film stretcher 170 and reduced further from the film stretcher 170. The scan area of the imaging device 180 is focused in the stretch area, where the de-wrinkling occurs.

Figure 6:
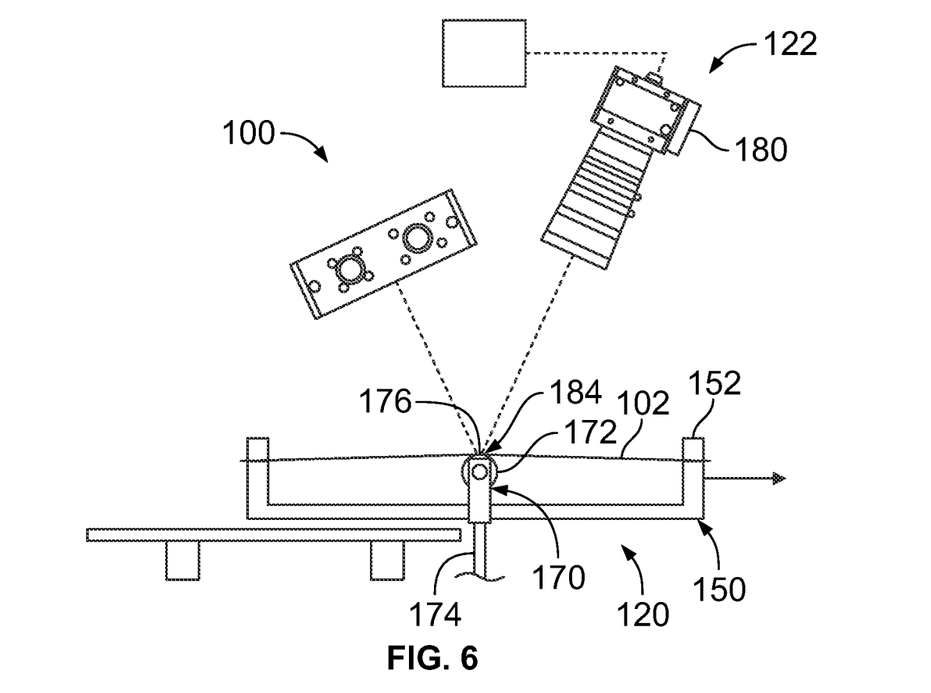
FIG. 6 is a side view of a portion of the film inspection system showing the film positioner and the vision system in accordance with an exemplary embodiment.
Figure 7:
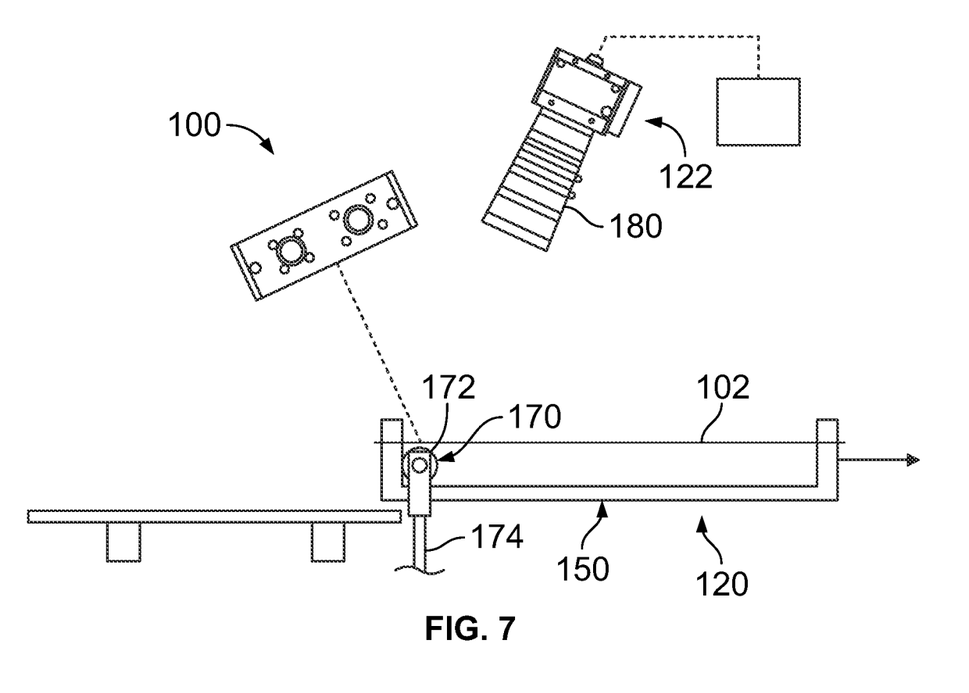
FIG. 7 is a side view of a portion of the film inspection system showing the film positioner and the vision system in accordance with an exemplary embodiment.

FIG. 6 is a side view of a portion of the film inspection system 100 showing the film positioner 120 and the vision system 122 in accordance with an exemplary embodiment. FIG. 6 illustrates the film positioner 120 at a third film positioning stage. During use, the film holder 150 and the imaging device 180 are movable relative to each other to move the scan area along the printed layer 112 to image the printed layer 112 of the printed film 102. In an exemplary embodiment, the film holder 150 is movable relative to the imaging device 180. For example, the imaging device 180 remains fixed, while the film holder 150 is moved side-to-side between a first position (FIG. 5) and a second position (FIG. 7). The film holder 150 is shown approximately halfway between the first position and the second position.

The imaging device 180 images the printed film 102 along a linear scan area 184 as the printed film 102 is moved side-to-side between the first position in the second position. The scan area 184 is generally coincident with the film interface 176 of the film stretcher 170. The film stretcher 170 continues to stretch the printed film 102 as the printed film 102 is moved side-two-side between the first position and the second position. The printed film 102 is stretched by the film stretcher 170 between the clamps 152. In an exemplary embodiment, the idler roller 172 roles along the bottom surface of the printed film 102 as the printed film 102 is moved between the first position and the second position. The rolling action of the idler roller 172 reduces damage to the printed film 102 as the printed film 102 is moved between the first position and the second position. Optionally, the amount of stretching induced by the film stretcher 170 may vary as the printed film 102 is moved between the first position and the second position. For example, the film stretcher actuator 174 may vary the vertical position of the idler roller 172 as the printed film 102 moves between the first position in the second position. For example, the idler roller 172 may be pushed further upward when engaging the center of the printed film 102 as compared to the side of the printed film 102 because more stretching may be needed when the idler roller 172 is located remote from the clamps 152 and less stretching may be needed when the idler roller 172 is located proximate to the clamps 152.

FIG. 7 is a side view of a portion of the film inspection system 100 showing the film positioner 120 and the vision system 122 in accordance with an exemplary embodiment. FIG. 7 illustrates the film positioner 120 at a fourth film positioning stage. FIG. 7 illustrates the film positioner 120 at the end of the imaging process. The imaging device 180 may stop imaging the printed film 102. After the imaging process is complete, the film stretcher 170 may be released from the printed film 102. The film stretcher actuator 174 moves the idler roller 172 to the retracted position. The idler roller 172 is disengaged from the printed film 102 in the retracted position. Once released, the film holder 150 may return to the home position (shown in FIG. 8). Alternatively, the film holder 150 may return to the home position without retracting the idler roller 172.

Figure 8:
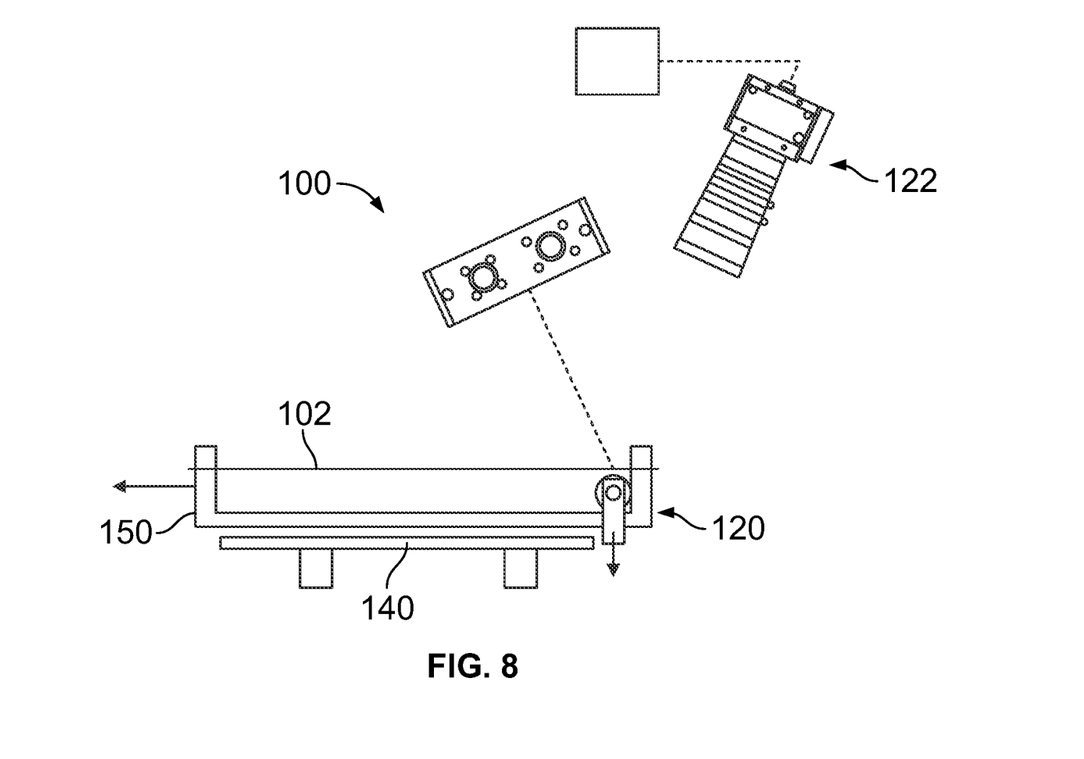
FIG. 8 is a side view of a portion of the film inspection system showing the film positioner and the vision system in accordance with an exemplary embodiment.

FIG. 8 is a side view of a portion of the film inspection system 100 showing the film positioner 120 and the vision system 122 in accordance with an exemplary embodiment. FIG. 8 illustrates the film positioner 120 at a fifth film positioning stage. FIG. 8 illustrates the film holder 150 returned to the home position, such as located above the support plate 140.

Figure 9:
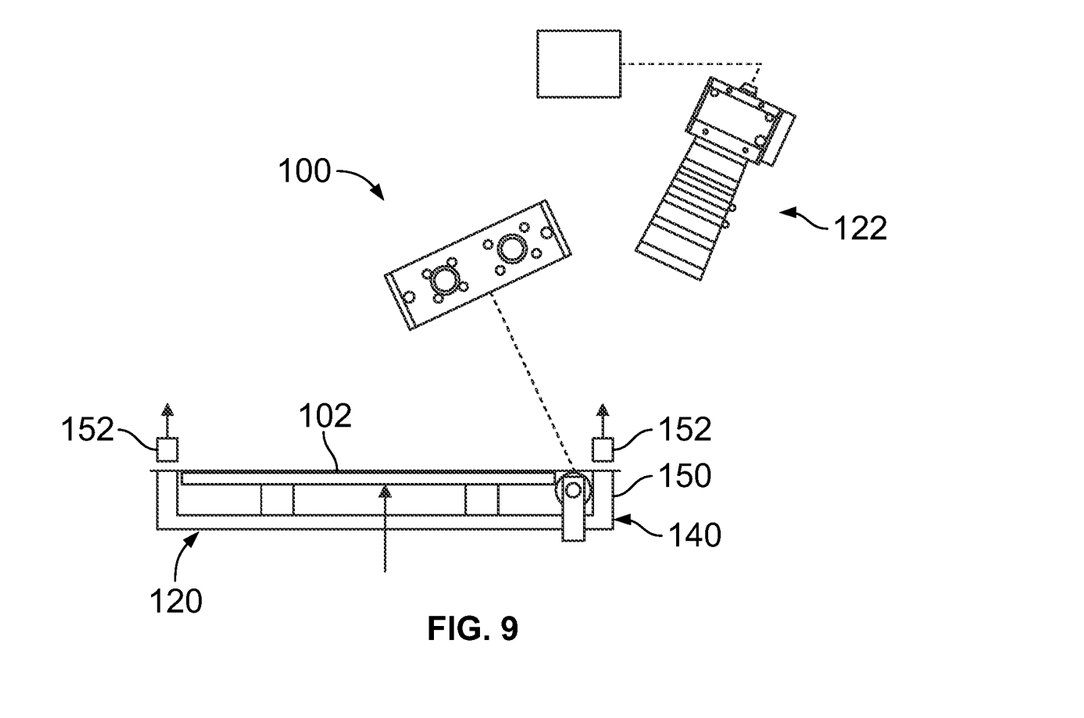
FIG. 9 is a side view of a portion of the film inspection system showing the film positioner and the vision system in accordance with an exemplary embodiment.

FIG. 9 is a side view of a portion of the film inspection system 100 showing the film positioner 120 and the vision system 122 in accordance with an exemplary embodiment. FIG. 9 illustrates the film positioner 120 at a sixth film positioning stage. FIG. 9 illustrates the support plate 140 returned to the supporting position. With the support plate 140 in the supporting position, the film holder 150 may be released from the printed film 102. For example, the clamps 152 may be released from the printed film 102 to allow the printed film 102 to be removed from the film positioner 120.

Figure 10:
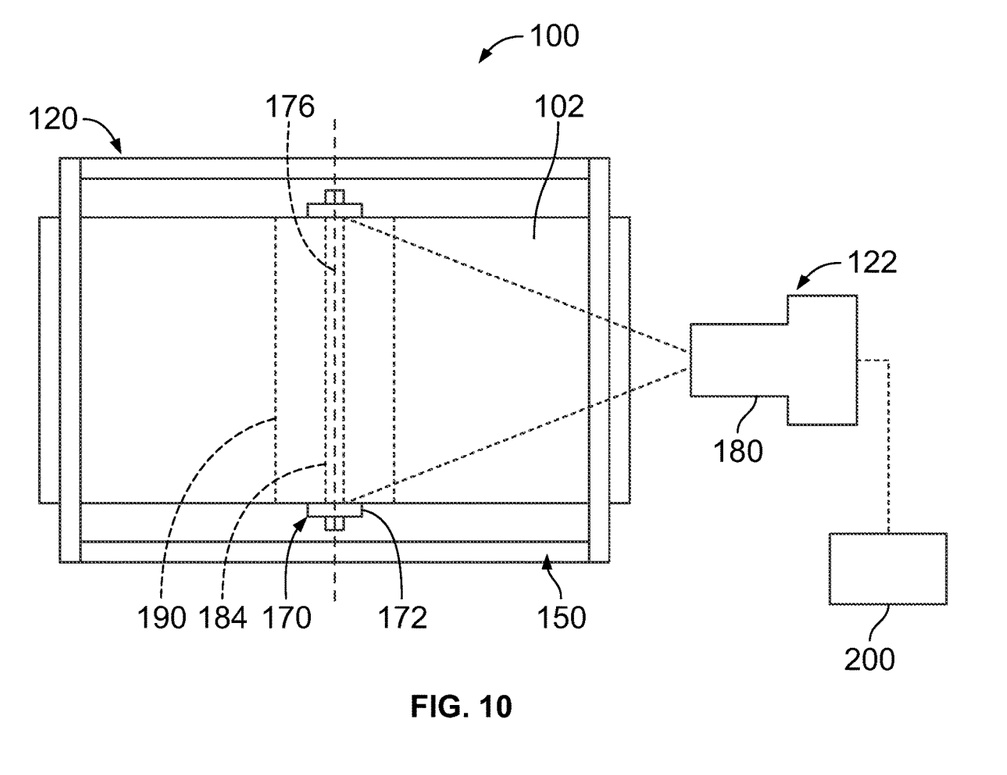
FIG. 10 is a top view of a portion of the film inspection system showing the film positioner and the vision system in accordance with an exemplary embodiment.

FIG. 10 is a top view of a portion of the film inspection system 100 showing the film positioner 120 and the vision system 122 in accordance with an exemplary embodiment. FIG. 10 shows the film positioner 120 holding the printed film 102 at the third film positioning stage (FIG. 6) where the film positioner 120 is approximately centered between the first position and the second position. The idler roller 172 engages the printed film 102 at the film interface 176. The film interface 176 extend along an axis parallel to the idler roller 172 of the film interface 176 is defined by the top of the idler roller 172 where the idler roller 172 engages the printed film 102. The idler roller 172 presses against the printed film 102 to form a stretch area 190 around the film interface 176. The stretch area 190 is elongated and generally surrounds the film interface 176. The stretch area 190 extends outward from the film interface 176 on both sides of the idler roller 172. The amount of pressure of the idler roller 172 against the printed film 102 may affect the width of the stretch area 190. For example, greater pressure of the idler roller 172 against the printed film 102 may widen the stretch area 190. The stretch area 190 is the area of greatest stretching induced by the film stretcher 170. The film stretcher 170 causes the greatest amount of de-wrinkling in the stretch area 190. A scan area 184 is located within the stretch area 190, such as centered in the stretch area 190. The scan area 184 may be coincident with the film interface 176.

The film inspection system 100 is used to inspect the wet printed layer of the printed film 102 for defects. The printed layer is inspected by imaging the printed area using the imaging device 180. The film stretcher 170 stretches the printed film 102 to reduce wrinkles for enhanced imaging, such as a reduction in false positives from imaging and analyzing the wrinkles. The film stretcher 170 flattens the printed film 102 in the imaging scan area (for example, line scan) to improve inspection results. The printed film 102 is flattened and the wrinkles are reduced without touching the wet printed layer to avoid damaging the wet printed layer. For example, the film stretcher presses upward on the printed film from below.

In an exemplary embodiment, the vision system 122 includes a controller 200, such as a computer or other processing device, for analyzing the images to identify defects. For example, the controller 200 may analyze the image for anomalies, such as using a boundary recognition tool or an image comparison tool.

The wet printed product is inspected for defects to reduce waste or scrap that would occur upon inspection after the printed film 102 is oven cured or dried. As such, time and resources are saved by identifying defects on the wet printed product. The film inspection system 100 may be used for identifying defects such as foreign object debris (FOD), scratches, voids, and the like in the printed layer of the printed film 102.

The film inspection system 100 is used to inspect the printed film 102 for defects. A method of using the film inspection system 100 to inspect the printed film 102 includes fixing the printed film 102 in the film holder 150, stretching the printed film 102 using the film stretcher 170 to remove wrinkles from the printed film 102 at the stretch area 190 while the perimeter of the printed film 102 is fixed by the film holder 150, and imaging the printed film 102 using the imaging device at the scan area 184, which is within the stretch area 190. The method includes processing the image of the printed film to identify defects, such as using the controller 200. The imaging may be line scan imaging. The imaging may occur by scanning the printed film 102 while moving the film holder 150 and the printed film 102 relative to the imaging device 180 to image the entire printed film 102. For example, the film holder 150 may slide between the first position (FIG. 5) and the second position (FIG. 7) to move the printed film relative to the film stretcher and the imaging device.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A film inspection system comprising:
a film positioner having a film holder configured to hold a printed film having a printed layer on a substrate of the printed film, the film holder configured to fix ends of the printed film along a perimeter of the printed film such that the ends of the printed film do not move relative to the film holder when fixed, the film positioner including a film stretcher positioned relative to the film holder to interface with the printed film, the film stretcher movable relative to the film holder to stretch the printed film at a stretch area while the ends of the printed film is remain fixed by the film holder; and
a vision system having an imaging device configured to image the printed film at a scan area within the stretch area, wherein the film holder and the imaging device are movable relative to each other to move the scan area along the printed layer to image the printed layer of the printed film;
wherein the film holder and the film stretcher are movable relative to each other to move the stretch area along the printed film during imaging of the printed film and wherein the ends of the printed film do not move relative to the film holder during imaging of the printed film.

2. The film inspection system of claim 1, wherein the film stretcher reduces wrinkles in the stretch area to improve defect detection on the printed film by the vision system.

3. The film inspection system of claim 1, wherein the film stretcher includes an idler roller configured to roll along the substrate as the printed film moves relative to the film stretcher.

4. The film inspection system of claim 1, wherein the film stretcher is fixed relative to the imaging device during imaging of the printed film.

5. The film inspection system of claim 1, wherein the film stretcher is movable between a retracted position and an extended position, the film stretcher disengaged from the printed film in the retracted position, the film stretcher engaging and stretching the printed film in the extended position.

6. The film inspection system of claim 1, wherein the film stretcher includes a film interface extending along an axis, the imaging device including a line scan camera imaging the printed film along the axis.

7. The film inspection system of claim 1, wherein the film holder is movable between a first position and a second position, the film holder configured to move the printed film relative to the film stretcher and the imaging device as the film holder moves between the first position in the second position.

8. The film inspection system of claim 1, wherein the film holder includes a carriage coupled to a rail, the carriage movable along the rail between a first position and a second position, the film holder including a clamp clamping the printed film to the carriage to fix the printed film in the film holder, the carriage configured to move the printed film relative to the film stretcher and the imaging device as the carriage moves between the first position and the second position.

9. The film inspection system of claim 1, wherein the film positioner includes a support plate having a support surface configured to support the printed film, the support plate and the film holder being movable relative to each other to release the printed film from the support surface after the printed film is fixed to the film holder.

10. The film inspection system of claim 9, wherein the support plate is movable between a supporting position and a released position, the support plate being disengaged from the printed film in the released position.

11. A film inspection system comprising:
a film positioner having a support plate having a support surface configured to support a printed film having a printed layer on a substrate of the printed film, the film positioner having a film holder configured to hold the printed film and fix the printed film relative to the film holder such that ends of the printed film do not move relative to the film holder when fixed, the support plate is movable relative to the film holder to a released position to release the printed film from the support surface after the printed film is fixed to the film holder, the film positioner including a film stretcher positioned relative to the support plate and the film holder to interface with the printed film, the film stretcher movable relative to the film holder to an extended position to stretch the printed film at a stretch area while the ends of the printed film are fixed by the film holder; and a vision system having an imaging device configured to image the printed film at a scan area within the stretch area, wherein the film holder is movable relative to the imaging device and the film stretcher to move the scan area along the printed layer for line scan imaging the printed layer of the printed film, the vision system including an imaging controller processing the image to identify defects;

wherein the film holder and the film stretcher are movable relative to each other to move the stretch area along the printed film during imaging of the printed film and wherein the ends of the printed film do not move relative to the film holder during imaging of the printed film.

12. The film inspection system of claim 11, wherein the film stretcher includes an idler roller configured to roll along the substrate as the printed film moves relative to the film stretcher.

13. The film inspection system of claim 11, wherein the film stretcher is fixed relative to the imaging device during imaging of the printed film.

14. The film inspection system of claim 11, wherein the film stretcher is movable between a retracted position and the extended position, the film stretcher disengaged from the printed film in the retracted position, the film stretcher engaging and stretching the printed film in the extended position.

15. The film inspection system of claim 11, wherein the film stretcher includes a film interface extending along an axis, the imaging device including a line scan camera imaging the printed film along the axis.

16. The film inspection system of claim 11, wherein the film holder is movable between a first position and a second position, the film holder configured to move the printed film relative to the film stretcher and the imaging device as the film holder moves between the first position in the second position.

17. A method of inspecting a printed film for defects, the method comprising:
fixing the printed film in a film holder such that ends of the printed film do not move relative to the film holder when fixed;
stretching the printed film using a film stretcher to remove wrinkles from the printed film at a stretch area while the ends the printed film are fixed by the film holder;
imaging the printed film at a scan area within the stretch area using an imaging device;
moving at least one or the film stretcher or the film holder during imaging to move the stretch area along the printed film during imaging of the printed film;
scanning the printed film by moving the film holder and the printed film relative to the imaging device to image the entire printed film wherein the ends of the printed film do not move relative to the film holder during imaging of the printed film; and
processing the image of the printed film to identify defects.

18. The method of claim 17, wherein the film stretcher includes an idler roller, said stretching the printed film comprises extending the idler roller into engagement with the printed film to stretch the printed film, the idler roller rolling along the printed film at the printed film moves relative to the idler roller.

19. The method of claim 17, further comprising sliding the film holder between a first position and a second position to move the printed film relative to the film stretcher and the imaging device.

20. The method of claim 17, further comprising supporting the printed film on a support plate in a supporting position and moving the support plate from the supporting position to a released position after the printed film is fixed in the film holder to release the support plate from the printed film.

\* \* \* \* \*